(12) United States Patent
Kishi et al.

(10) Patent No.: US 12,515,954 B2
(45) Date of Patent: Jan. 6, 2026

(54) HYDROXYAPATITE PARTICULATE

(71) Applicant: SHIRAISHI KOGYO KAISHA, LTD., Osaka (JP)

(72) Inventors: Kohei Kishi, Hyogo (JP); Shota Umemoto, Hyogo (JP)

(73) Assignee: SHIRAISHI KOGYO KAISHA, LTD., Osaka (JP)

( * ) Notice: Subject to any disclaimer, the term of this patent is extended or adjusted under 35 U.S.C. 154(b) by 985 days.

(21) Appl. No.: 17/418,039

(22) PCT Filed: Dec. 27, 2019

(86) PCT No.: PCT/JP2019/051429
§ 371 (c)(1),
(2) Date: Jun. 24, 2021

(87) PCT Pub. No.: WO2020/138422
PCT Pub. Date: Jul. 2, 2020

(65) Prior Publication Data
US 2022/0089440 A1    Mar. 24, 2022

(30) Foreign Application Priority Data

Dec. 27, 2018  (JP) ................................. 2018-245024

(51) Int. Cl.
*C01B 25/32*    (2006.01)
*A61K 6/54*    (2020.01)

(52) U.S. Cl.
CPC ............... *C01B 25/32* (2013.01); *A61K 6/54* (2020.01); *C01P 2002/72* (2013.01); *C01P 2004/61* (2013.01); *C01P 2006/12* (2013.01)

(58) Field of Classification Search
None
See application file for complete search history.

(56) References Cited

U.S. PATENT DOCUMENTS

| 5,405,436 A | 4/1995 | Maurer et al. |
| 11,759,405 B2 * | 9/2023 | Ideue ....................... A61K 8/19 |
| | | 424/401 |

(Continued)

FOREIGN PATENT DOCUMENTS

| CN | 101001634 | 7/2007 |
| CN | 101254910 | 9/2008 |

(Continued)

OTHER PUBLICATIONS

Kim, M. S. and Kim, Y.-J. Synthesis of calcium-deficient hydroxyapatite in the presence of amphiphilic triblock copolymer. Materials Letters 66 (2012) 33-35. (Year: 2012).*

(Continued)

*Primary Examiner* — Anthony J Zimmer
*Assistant Examiner* — Zachary John Baum
(74) *Attorney, Agent, or Firm* — Wenderoth, Lind & Ponack, L.L.P.

(57) ABSTRACT

An object is to provide a particle that has properties to seal dentinal tubules, and that exhibits excellent adhesion in dentinal tubules. The object is achieved by a fine hydroxyapatite particle that has a ratio of the diffraction peak intensity around $2\theta=32°$ to the diffraction peak intensity around $2\theta=26°$ of 0.8 to 1.6 in an X-ray diffraction pattern as measured by using CuKα radiation, and that is an aggregate of particles.

10 Claims, 13 Drawing Sheets

(56) References Cited

U.S. PATENT DOCUMENTS

| | | | |
|---|---|---|---|
| 2008/0206554 A1* | 8/2008 | Riman | B01J 20/28004 |
| | | | 427/430.1 |
| 2010/0129298 A1 | 5/2010 | Sakuma et al. | |
| 2015/0202128 A1 | 7/2015 | Saito et al. | |

FOREIGN PATENT DOCUMENTS

| | | | |
|---|---|---|---|
| CN | 101646413 | 2/2010 | |
| CN | 102583286 | 7/2012 | |
| CN | 103112837 | 5/2013 | |
| CN | 105347322 | 2/2016 | |
| CN | 105502323 | 4/2016 | |
| EP | 0 639 366 | 2/1995 | |
| EP | 1394132 A2 * | 3/2004 | A61L 24/0063 |
| JP | H0853331 A * | 2/1996 | |
| JP | 9-20508 | 1/1997 | |
| JP | 11-292524 | 10/1999 | |
| JP | 2005-75722 | 3/2005 | |
| JP | 2005-325102 | 11/2005 | |
| JP | 2010-208896 | 9/2010 | |
| JP | 2010-222325 | 10/2010 | |
| JP | 2014-181231 | 9/2014 | |
| JP | 2018-65715 | 4/2018 | |
| KR | 10-2010-0011395 | 2/2010 | |
| WO | 00/03747 | 1/2000 | |
| WO | WO-0003747 A2 * | 1/2000 | A61K 6/75 |
| WO | 2006/014531 | 2/2006 | |
| WO | 2013/117913 | 8/2013 | |
| WO | 2014/038195 | 3/2014 | |

OTHER PUBLICATIONS

Mavropoulos, E., et al. Dissolution of calcium-deficient hydroxyapatite synthesized at different conditions. Materials Characterization 50 (2003) 203-207. (Year: 2003).*
English translation of JP H0853331 A. (Year: 1996).*
Libonati, F., et al. Fracture mechanics of hydroxyapatite single crystals under geometric confinement. Journal of the Mechanical Behavior of Biomedical Materials 20 (2013) 184-191. (Year: 2013).*
Decision of Refusal issued Jun. 20, 2023 in corresponding Japanese Patent Application No. 2020-562499, with English language translation.
International Search Report issued Feb. 10, 2020 in International (PCT) Application No. PCT/JP2019/051429.
Kim et al., "Synthesis of calcium-deficient hydroxyapatite in the presence of amphiphilic triblock copolymer", Materials Letters, Aug. 24, 2011, vol. 66, pp. 33-35.
Cacciotti et al., "High thermally stable Mg-substituted tricalcium phosphate via precipitation", Ceramics International, Aug. 21, 2010, vol. 37, pp. 127-137.
Lukie et al., "Dense fine-grained biphasic calcium phosphate (BCP) bioceramics designed by two-step sintering", Journal of the European Ceramic Society, 2011, vol. 31, pp. 19-27.
Third party observation submitted Apr. 22, 2021 filed against corresponding International Application No. PCT/JP2019/051429.
Third Party Observation filed Jul. 21, 2023 in corresponding European Patent Application No. 19902999.2.

* cited by examiner

HYDROXYAPATITE PARTICULATE

TECHNICAL FIELD

The present invention relates to a fine hydroxyapatite particle, an additive for an oral composition, a dentinal tubule sealant, and a method for producing a fine hydroxyapatite particle.

BACKGROUND ART

Hypersensitivity develops when dentin is exposed, for example, due to physical wear caused by brushing or chemical wear caused by acids. When the dentin is exposed, external stimuli impact nerves in the dentinal tubules in the dentin, making pain likely to occur.

Hypersensitivity has been addressed by sealing the dentinal tubules, for example, by particles such as of fluoride or aluminum salts (e.g., PTL 1), to prevent external stimuli from reaching the nerves. However, many conventional methods are insufficient in terms of adhesion after sealing, and the persistence of the effect remains to be addressed.

CITATION LIST

Patent Literature

PTL 1: JP2010-222325A

SUMMARY OF INVENTION

Technical Problem

An object of the present invention is to provide particles that have properties to seal dentinal tubules, and that exhibit excellent adhesion in dentinal tubules.

Solution to Problem

The present inventors conducted extensive research to achieve the object. They found that the object can be achieved by fine hydroxyapatite particles that have a ratio of the diffraction peak intensity around $2\theta=32°$ to the diffraction peak intensity around $2\theta=26°$ of 0.8 to 1.6 in an X-ray diffraction pattern, as measured by using CuKα radiation; and that are each an aggregate of particles. The inventors further conducted research based on this finding, and then completed the present invention.

Specifically, the present invention includes the following subject matter.
Item 1.
A fine hydroxyapatite particle having a ratio of a diffraction peak intensity around $2\theta=32°$ to a diffraction peak intensity around $2\theta=26°$ of 0.8 to 1.6 in an X-ray diffraction pattern as measured by using CuKα radiation, the fine hydroxyapatite particle being an aggregate of particles.
Item 2.
The fine hydroxyapatite particle according to Item 1, having a Ca/P molar ratio of less than 1.67.
Item 3.
The fine hydroxyapatite particle according to Item 1 or 2, having a Ca/P molar ratio of 1.60 or less.
Item 4.
The fine hydroxyapatite particle according to any one of Items 1 to 3, having a median diameter of 5 μm or less.
Item 5.
The fine hydroxyapatite particle according to any one of Items 1 to 4, having a specific surface area of 30 to 200 m²/g.
Item 6.
The fine hydroxyapatite particle according to any one of Items 1 to 5, having a ratio of a diffraction peak intensity around $2\theta=34°$ to a diffraction peak intensity around $2\theta=32°$ of 1 or less in an X-ray diffraction pattern as measured by using CuKα radiation.
Item 7.
An additive for an oral composition, the additive comprising the fine hydroxyapatite particle of any one of Items 1 to 6.
Item 8.
A dentinal tubule sealant comprising the fine hydroxyapatite particle of any one of Items 1 to 6.
Item 9.
A method for producing a fine hydroxyapatite particle, comprising mixing an aqueous alkaline phosphate solution with a pH of 4 or more and less than 7 with a calcium hydroxide slurry to react the mixture at 35 to 85° C.
Item 10.
The method according to Item 9, wherein the calcium hydroxide slurry is a ground calcium hydroxide slurry.
Item 11.
The method according to Item 9 or 10, wherein the calcium hydroxide slurry has a reactivity with oxalic acid of 40 minutes or less, the reactivity with oxalic acid being a period of time (minutes) until a pH of 7.0 is achieved after 40 g of an aqueous oxalic acid solution that is maintained at 25±1° C. and that has a concentration of 0.5 mol/L is added at one time to 50 g of the calcium hydroxide slurry that is adjusted to a concentration of 5 mass % and that is maintained at 25±1° C.
Item 12.
The method according to any one of Items 9 to 11, wherein the calcium hydroxide slurry has a BET specific surface area of 5 m²/g or more.

Advantageous Effects of Invention

The present invention provides a fine hydroxyapatite particle that has properties to seal dentinal tubules, and that exhibits excellent adhesion in dentinal tubules. The present invention also provides an additive for an oral composition, a dentinal tubule sealant, and the like, containing this fine particle.

DESCRIPTION OF EMBODIMENTS

Figure 1:
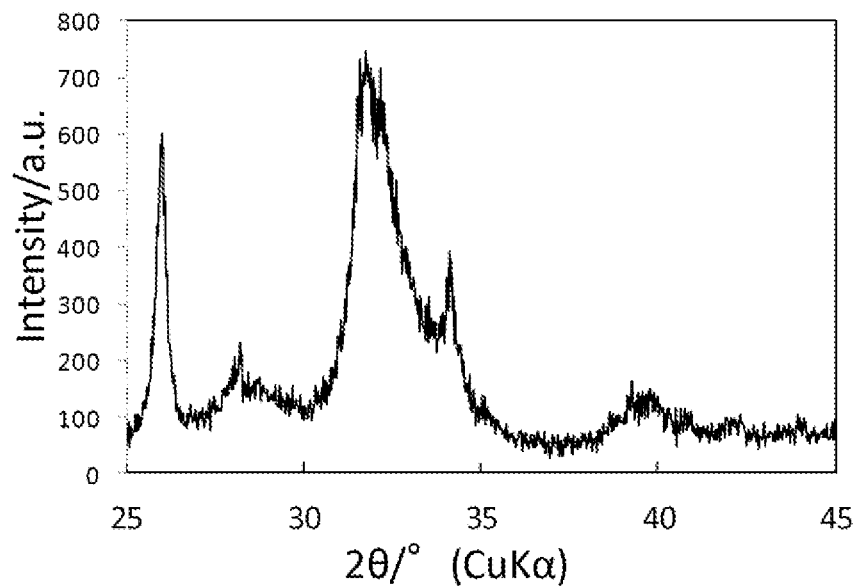
FIG. 1 illustrates the X-ray diffraction peaks of the fine hydroxyapatite particles in Example 1.

In the present specification, the terms "comprise," "contain," and "include" include the concepts of "comprising," "containing," "including," "consisting essentially of," and "consisting of."

1. Fine Hydroxyapatite Particle

In an embodiment, the present invention relates to a fine hydroxyapatite particle that has a ratio of the diffraction peak intensity around $2\theta=32°$ to the diffraction peak intensity around $2\theta=26°$ of 0.8 to 1.6 in an X-ray diffraction pattern as measured by using CuKα radiation, and that is an aggregate of particles (which may be referred to as "the fine particle according to the present invention" in the present specification). The fine hydroxyapatite particle is described below.

The diffraction peak around $2\theta=26°$ is a peak of hydroxyapatite, specifically, a diffraction peak at $2\theta=25.5$ to $26.5°$. When there are multiple diffraction peaks, the diffraction peak around $2\theta=26°$ is a diffraction peak with the highest intensity.

The diffraction peak around $2\theta=32°$ is a peak of hydroxyapatite, specifically, a diffraction peak at $2\theta=31.5$ to $32.5°$. When there are multiple diffraction peaks, the diffraction peak around $2\theta=32°$ refers to a diffraction peak with the highest intensity.

The X-ray diffraction pattern can be obtained by any method, and can be obtained by a method in accordance with a known method. For example, an X-ray diffraction pattern can be obtained under the conditions of device: MultiFlex 2 kW X-ray diffractometer (produced by Rigaku Corporation), target: Cu, tube voltage: 40 kV, tube current: 30 mA, sampling range: 0.02°, scanning rate: 2.00°/min, divergence slit: 1.0°, scatter slit: 1.0°, and light-receiving slit: 0.3 mm. Alternatively, an X-ray diffraction pattern can be obtained under the conditions of device: MiniFlex 500 X-ray diffractometer (produced by Rigaku Corporation), target: Cu, tube voltage: 40 kV, tube current: 15 mA, sampling range: 0.02°, scanning rate: 2.00°/min, divergence slit: 1.25°, scatter slit: 1.25°, and light-receiving slit: 0.3 mm.

The fine particle according to the present invention has a ratio of the diffraction peak intensity around $2\theta=32°$ to the diffraction peak intensity around $2\theta=26°$ (32°/26°) of 0.8 to 1.6. The ratio of peak intensity is preferably 0.8 to 1.5, more preferably 0.9 to 1.3, still more preferably 1.0 to 1.25, yet more preferably 1.05 to 1.2, and particularly preferably 1.05 to 1.15. The upper limit of the ratio of peak intensity is preferably 1.60, 1.59, or 1.58.

Each fine particle according to the present invention is an aggregate of particles. The particles that constitute a fine particle according to the present invention are particularly preferably plate-like particles. The plate-like particles that constitute a fine particle according to the present invention may be of any shape; examples of the shape include a circle, a polygon, a rod-like shape, and combinations of these shapes. The plate-like particles may be either in a state in which the plate-like particles are folded at their plane or a state in which the plate-like particles are not folded at their plane, with the planar structure maintained.

The fine particle according to the present invention contains hydroxyapatite as a major component. In an X-ray diffraction pattern of the fine particle according to the present invention, the peaks of other substances (e.g., monetite) are not separately observed, or the peak intensity of other substances is relatively low. Thus, the fine particle according to the present invention is distinguished from these fine particles whose peaks have a high peak intensity.

Not wishing to be bound by limited interpretation, it is speculated that partly due to the shape and structure shown in a specific X-ray diffraction pattern and the structure formed by aggregated particles, and the combination thereof, the fine particle according to the present invention exhibits excellent properties to seal dentinal tubules and excellent adhesion in dentinal tubules.

In a preferable embodiment of the fine particle according to the present invention, the ratio of the diffraction peak intensity around $2\theta=34°$ to the diffraction peak intensity around $2\theta=32°$ in an X-ray diffraction pattern (34°/32°) is 1 or less. The diffraction peak around $2\theta=34°$ is specifically a diffraction peak at $2\theta=33.5$ to $34.5°$. When there are multiple diffraction peaks, the diffraction peak around $2\theta=34°$ refers to a diffraction peak with the highest intensity. The ratio of peak intensity is preferably 0.1 to 1, more preferably 0.2 to 0.9, still more preferably 0.3 to 0.8, yet more preferably 0.4 to 0.7, and particularly preferably 0.4 to 0.6.

In a preferable embodiment of the fine particle according to the present invention, the sum of the areas of all of the diffraction peaks within $25.5°\leq 2\theta \leq 26.5°$ and the areas of all of the diffraction peaks within $31.5°\leq 2\theta \leq 32.5°$ is 30 to 45% based on the sum of the areas of all diffraction peaks within 25°≤2θ≤35° taken as 100%. This value is preferably 33 to 42%, and more preferably 35 to 40%. In a preferable embodiment of the fine particle according to the present invention, the crystallite size calculated from the diffraction peak of the (130) plane around 2θ=40° is 12 nm or less, and preferably 10 nm or less. Not wishing to be bound by limited interpretation, it is speculated that the relatively low crystallinity facilitates the crystal growth in the dentinal tubules after the tubules are sealed, and further improves the adhesion in the dentinal tubules. The lower limit of the crystallite size is not particularly limited, and is, for example, 1 nm, 2 nm, 3 nm, 4 nm, or 5 nm.

The Ca/P molar ratio of the fine particle according to the present invention can be any value that hydroxyapatite can take. In the fine particle according to the present invention, some calcium is believed to be replaced with another element (e.g., sodium). Thus, the Ca/P molar ratio can be a relatively low value. From this viewpoint, the Ca/P molar ratio of the fine particle according to the present invention is preferably less than 1.67, more preferably 1.60 or less, still more preferably 1.5 or less, and yet more preferably 1.4 or less. The lower limit of the Ca/P molar ratio of the fine particle according to the present invention is not particularly limited, and is, for example, 1.0, 1.1, or 1.2.

The fine particles according to the present invention may have any median diameter (Dx(50)). From the standpoint of, for example, the properties to seal dentinal tubules and adhesion, the median diameter of the fine particles according to the present invention is preferably 5 μm or less, and more preferably 4.5 μm or less. The lower limit of the median diameter is not particularly limited, and is, for example, 1 μm, 2 μm, or 3 μm.

The fine particle according to the present invention may have any specific surface area. From the standpoint of, for example, the properties to seal dentinal tubules and adhesion, the specific surface area of the fine particle according to the present invention is preferably 30 $m^2/g$ or more, more preferably 40 $m^2/g$ or more, still more preferably 55 $m^2/g$ or more, and yet more preferably 55 $m^2/g$ or more. The upper limit of the specific surface area is not particularly limited, and is, for example, 200 $m^2/g$, 150 $m^2/g$, 120 $m^2/g$, 100 $m^2/g$, or 90 $m^2/g$.

2. Production Method

In an embodiment, the present invention relates to a method for producing a fine hydroxyapatite particle comprising mixing an aqueous alkaline phosphate solution with a pH of 4 or more and less than 7 with a calcium hydroxide slurry to react the mixture at 35 to 85° C. For example, the fine particle according to the present invention may be produced by this method.

The alkaline phosphate can be any alkaline phosphate, and includes hydrates and anhydrides. Examples of alkaline phosphates include sodium dihydrogen phosphate, disodium hydrogen phosphate, trisodium phosphate, tetrasodium pyrophosphate, potassium dihydrogen phosphate, dipotassium hydrogen phosphate, and tripotassium phosphate; the alkaline phosphate is preferably a sodium phosphate, such as sodium dihydrogen phosphate, disodium hydrogen phosphate, and trisodium phosphate, and more preferably sodium dihydrogen phosphate.

The concentration of the alkaline phosphate in the aqueous alkaline phosphate solution is not particularly limited, and is, for example 3 to 50 mass %. The concentration of the alkaline phosphate is preferably 3 to 30 mass %, more preferably 5 to 20 mass %, and still more preferably 7 to 15 mass %.

The pH of the aqueous alkaline phosphate solution is preferably 4 or more and less than 7. The pH of the aqueous alkaline phosphate solution is more preferably 5 to 6.5. As described later, when the aqueous alkaline phosphate solution has a relatively low pH (e.g., a pH of 4 or more and less than 5), it is preferred that an anhydride be used as an alkaline phosphate, and that the reaction temperature be set to a relatively high temperature, for example, 65 to 85° C., preferably 70 to 85° C., and more preferably 75 to 85° C.

The calcium hydroxide slurry can be any calcium hydroxide slurry, as long as it is slurry of calcium hydroxide reactive with oxalic acid.

The reactivity with oxalic acid is expressed as, for example, by the following definition. Reactivity with Oxalic Acid: a period of time (minutes) until a pH of 7.0 is achieved after 40 g of an aqueous oxalic acid solution that is maintained at 25±1° C. and that has a concentration of 0.5 mol/L is added at one time to 50 g of a calcium hydroxide slurry that is adjusted to a concentration of 5 mass % and that is maintained at 25±1° C.

The reactivity with oxalic acid expressed by the above definition is preferably 40 minutes or less, more preferably 30 minutes or less, and still more preferably 20 minutes or less.

The calcium hydroxide slurry has a BET specific surface area of preferably 5 $m^2/g$ or more, and more preferably 6 $m^2/g$ or more. The upper limit of the BET specific surface area is not particularly limited, and is, for example, 20 $m^2/g$, 15 $m^2/g$, or 10 $m^2/g$.

A calcium hydroxide slurry with a high reactivity with oxalic acid can be typically obtained by grinding a calcium hydroxide slurry. Grinding treatment can further increase the reactivity with oxalic acid (the period of time defined above is further shortened). Grinding treatment is performed by using, for example, a bead mill. The conditions for grinding treatment are not particularly limited. For example, the conditions according to the method disclosed in JP2017-036176A can be used.

The calcium hydroxide slurry is prepared, for example, by reacting quicklime (calcium oxide) obtained by calcining limestone with water. For example, a calcium hydroxide slurry can be obtained by calcining limestone in a kiln at about 1000° C. to form quicklime, pouring thereinto hot water in an amount about 10 times that of this quicklime, and stirring the mixture for 30 minutes.

The solids concentration of the calcium hydroxide slurry is not particularly limited, and is, for example, 1 to 30 mass %, preferably 3 to 20 mass %, more preferably 5 to 15 mass %, and still more preferably 6 to 12 mass %.

The amount ratio of the aqueous alkaline phosphate solution to the calcium hydroxide slurry is not particularly limited as long as the fine hydroxyapatite particles can be produced. The amount ratio is preferably adjusted such that the Ca/P molar ratio results in preferably 0.3 to 0.7, more preferably 0.4 to 0.6, and still more preferably 0.45 to 0.55.

The mode in which the aqueous alkaline phosphate solution is mixed with the calcium hydroxide slurry is not particularly limited. Examples include a mode in which the calcium hydroxide slurry is added to a reaction vessel containing the aqueous alkaline phosphate solution (mode 1), a mode in which the aqueous alkaline phosphate solution is added to a reaction vessel containing the calcium hydroxide slurry (mode 2), and a mode in which the aqueous alkaline phosphate solution and the calcium hydroxide slurry are added to a reaction vessel simultaneously (mode 3). Of these, mode 1 is preferable. When the aqueous alkaline phosphate solution and/or the calcium hydroxide slurry is added to a reaction vessel, the liquid in the reaction vessel is typically being stirred.

The addition of the aqueous alkaline phosphate solution and/or the calcium hydroxide slurry to a reaction vessel is preferably performed over a predetermined period of time. The period of time from the start of addition until the end of addition is, for example, 10 to 90 minutes, preferably 20 to 60 minutes, and more preferably 20 to 40 minutes.

The reaction is typically performed with stirring. The reaction temperature is 35 to 85° C. The reaction temperature is preferably 40 to 75° C., more preferably 45 to 70° C., still more preferably 50 to 70° C., and yet more preferably 55 to 65° C. When the aqueous alkaline phosphate solution has a relatively low pH (e.g., a pH of 4 or more and less than 5), it is preferred that an anhydride be used as an alkaline phosphate, and that the reaction temperature be set to a relatively high temperature, for example 65 to 85° C., preferably 70 to 85° C., and more preferably 75 to 85° C. The reaction time (a time period that starts after the aqueous alkaline phosphate solution and the calcium hydroxide slurry have been fully mixed; in modes 1 to 3, a time period that starts after the addition of the aqueous alkaline phosphate solution and the calcium hydroxide slurry is ended) is, for example, 10 to 180 minutes, preferably 20 to 120 minutes, more preferably 40 to 90 minutes, and still more preferably 50 to 70 minutes.

The fine particle according to the present invention formed by performing the above step can be optionally subjected to purification treatment. Examples of purification treatment include filtration and washing with water. The fine particle according to the present invention can also optionally be subjected to drying treatment.

3. Use

The fine particle according to the present invention have properties to seal dentinal tubules, and are excellent in adhesion in dentinal tubules. Thus, the fine particle according to the present invention can be used in, for example, an additive for an oral composition, and a dentinal tubule sealant. From this viewpoint, the present invention, in an embodiment, relates to an additive for an oral composition comprising the fine particle according to the present invention, and a dentinal tubule sealant comprising the fine particle according to the present invention.

EXAMPLES

The present invention is described in detail below based on Examples. However, the present invention is not limited the Examples.

Example 1

A 10.7 mass % aqueous solution of sodium dihydrogen phosphate-2 hydrate and a ground calcium hydroxide slurry with a solids concentration of 8.6 mass % (BET specific surface area: 6.7 m$^2$/g, reactivity with oxalic acid: 15 minutes and 30 seconds, JP2017-036176A) were prepared so as to give a Ca/P molar ratio of 0.5. The aqueous solution of sodium dihydrogen phosphate-2 hydrate was placed in a stainless-steel beaker, and heated to 60° C. with stirring. This temperature was maintained until the end of stirring. A 10% aqueous solution of NaOH was added to adjust the pH to 5.5. The calcium hydroxide slurry was added thereto over a period of 30 minutes. After completion of the addition, the mixture was further stirred for 1 hour, and then filtered and washed with water, followed by drying at 80° C., thereby obtaining fine hydroxyapatite particles (powder).

The obtained fine hydroxyapatite particles were measured for X-ray crystal diffraction, specific surface area, particle size distribution, and Ca/P molar ratio, and observed for shape.

Figure 2:
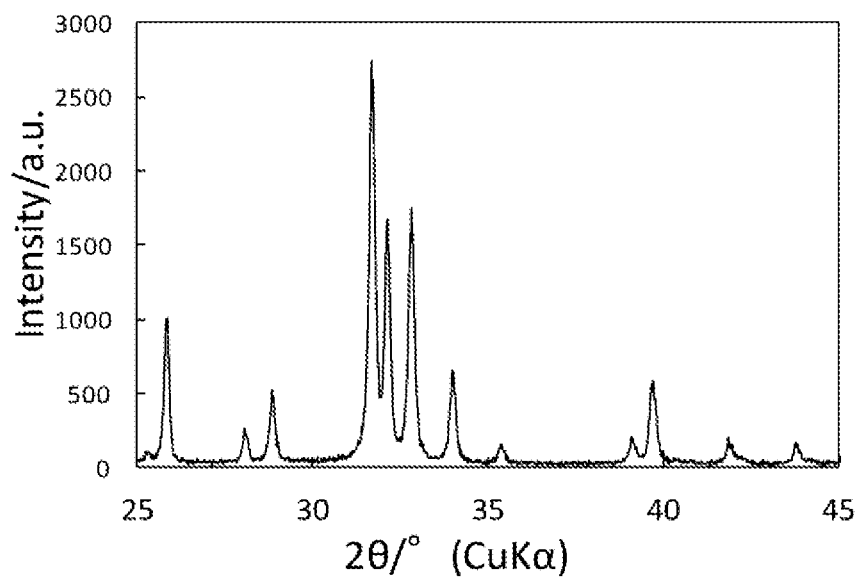
FIG. 2 illustrates the X-ray diffraction peaks of fine hydroxyapatite particles of a commercially available reagent.

Measurement was performed with a MultiFlex 2 kW X-ray diffractometer (produced by Rigaku Corporation) within the range of 2θ=25 to 45°. The measurement conditions are target: Cu, tube voltage: 40 kV, tube current: 30 mA, sampling range: 0.02°, scanning rate: 2.00°/min, divergence slit: 1.0°, scatter slit: 1.0°, and light-receiving slit: 0.3 mm. FIG. 1 illustrates the results. FIG. 2 illustrates the X-ray diffraction pattern of hydroxyapatite, which is a commercially available reagent. The ratio of the diffraction peak intensity of the (211) plane around 2θ=32° to the diffraction peak intensity of the (002) plane around 2θ=26° was 1.1, which was clearly lower than the peak intensity ratio 2.7 of the reagent HAp. This indicated that the fine hydroxyapatite particles of Example 1 are plate-like fine particles with the large part of the c-plane exposed. The sum of the areas of all of the diffraction peaks within the range of 25.5°≤2θ≤26.5° and the areas of all of the diffraction peaks within the range of 31.5°≤2θ≤32.5° was 37.2%, based on the sum of the areas of all of the diffraction peaks within the range of 25°≤2θ≤135° taken as 100%. This value is clearly lower than the 52.1% indicated by the reagent Hap; the relatively broad X-ray diffraction pattern also suggests low crystallinity. Additionally, the crystallite size calculated from the diffraction peak of the (130) plane around 2θ=40° was 7 nm, which is clearly lower than the 52 nm indicated by the reagent Hap. This also suggests low crystallinity.

The specific surface area was measured by the nitrogen gas adsorption method with a fully automatic specific surface area analyzer (Macsorb HMmodel-1208, produced by Mountech Co. Ltd.). The specific surface area was 61.9 m$^2$/g.

The particle size distribution was measured in accordance with dry particle size distribution measurement with a laser diffraction particle size distribution analyzer (Mastersizer 3000). The Dx(50) was 3.76 μm.

The Ca/P molar ratio was determined by measuring the content of Ca and P with iCAP6000 ICP-OES (produced by Thermo Fisher Scientific) by inductively coupled plasma optical emission spectroscopy, and calculating the ratio from the measurement values. The Ca/P molar ratio was 1.33.

Figure 3:
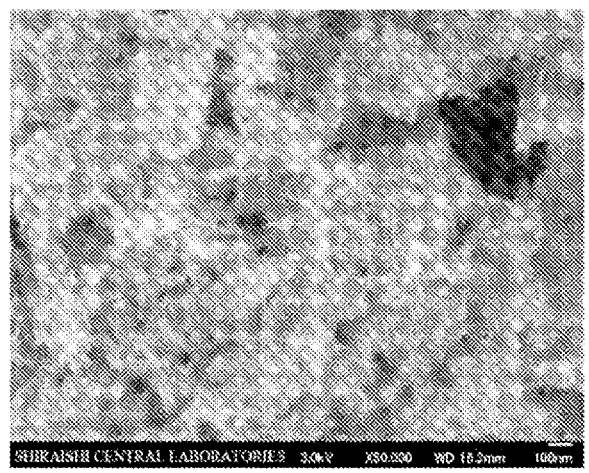
FIG. 3 illustrates an SEM photograph of the fine hydroxyapatite particles in Example 1.

The shape was observed with a scanning electron microscope (produced by JEOL Ltd., "SEM" below). FIG. 3 illustrates the results. The results indicated that the hydroxyapatite obtained in the present invention was in the form of aggregates of plate-like fine particles.

Example 2

A 10.7 mass % aqueous solution of sodium dihydrogen phosphate-2 hydrate and a ground calcium hydroxide slurry with a solids concentration of 8.6 mass % (BET specific surface area: 7.9 m$^2$/g, reactivity with oxalic acid: 12 minutes and 30 seconds, JP2017-036176A) were prepared so as to give a Ca/P molar ratio of 0.5. The aqueous solution of sodium dihydrogen phosphate-2 hydrate was placed in a stainless-steel beaker, and heated to 60° C. with stirring. This temperature was maintained until the end of stirring. A 10% aqueous solution of NaOH was added to adjust the pH to 6.0. The calcium hydroxide slurry was added thereto over a period of 30 minutes. After completion of the addition, the mixture was further stirred for 1 hour, and then filtered and washed with water, followed by drying at 80° C., thereby obtaining fine hydroxyapatite particles (powder).

The obtained fine hydroxyapatite particles were measured for X-ray crystal diffraction and specific surface area, and observed for shape in the same manner as in Example 1.

Figure 4:
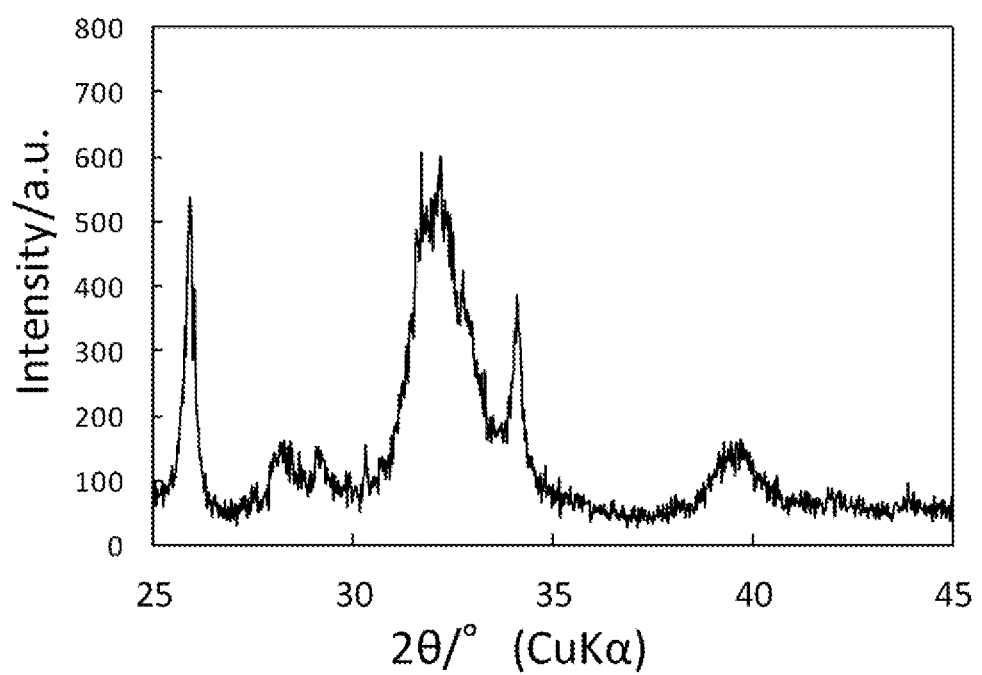
FIG. 4 illustrates the X-ray diffraction peaks of the fine hydroxyapatite particles in Example 2.

FIG. 4 illustrates the results of X-ray crystal diffraction. The ratio of the diffraction peak intensity of the (211) plane around 2θ=32° to the diffraction peak intensity of the (002) plane around 2θ=26° was 1.1, which was the same value as that of Example 1. The sum of the areas of all of the diffraction peaks within the range of 25.5°≤2θ≤26.5° and the areas of all of the diffraction peaks within the range of 31.5°≤2θ≤32.5° was 38.6% based on the sum of the areas of all of the diffraction peaks within the range of 25°≤2θ≤35° taken as 100%. The crystallite size calculated from the diffraction peak of the (130) plane around 2θ=40° was 7 nm.

The specific surface area was 75.4 m²/g.

Figure 5:
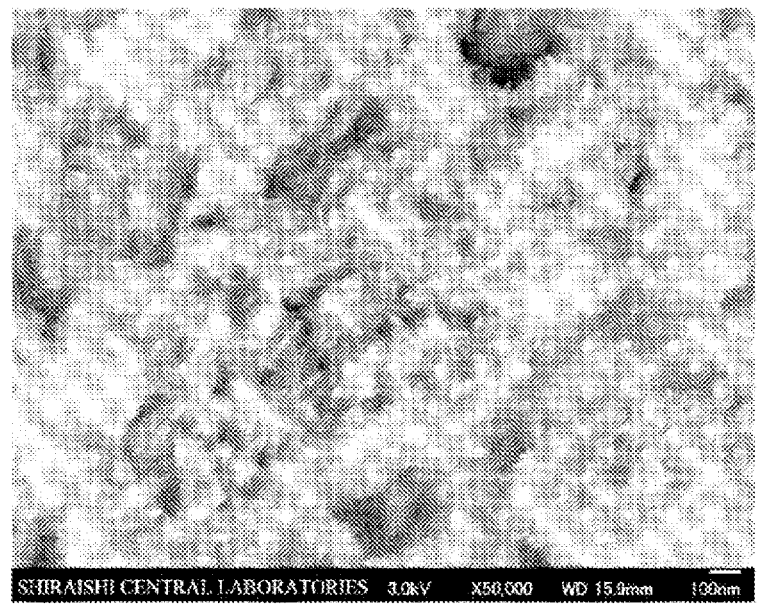
FIG. 5 illustrates an SEM photograph of the fine hydroxyapatite particles in Example 2.

FIG. 5 illustrates the results of shape observation. The results indicated that the obtained hydroxyapatite was in the form of aggregates of plate-like fine particles, as in Example 1.

Example 3

A 10.7 mass % aqueous solution of sodium dihydrogen phosphate-2 hydrate and a ground calcium hydroxide slurry with a solids concentration of 8.6 mass % (BET specific surface area: 7.9 m²/g, reactivity with oxalic acid: 12 minutes and 30 seconds, JP2017-036176A) were prepared so as to give a Ca/P molar ratio of 0.5. The aqueous solution of sodium dihydrogen phosphate-2 hydrate was placed in a stainless-steel beaker, and heated to 40° C. with stirring. This temperature was maintained until the end of stirring. A 10% aqueous solution of NaOH was added to adjust the pH to 5.5. The calcium hydroxide slurry was added thereto over a period of 50 minutes. After completion of the addition, the mixture was further stirred for 1 hour, and then filtered and washed with water, followed by drying at 80° C., thereby obtaining fine hydroxyapatite particles (powder).

The obtained fine hydroxyapatite particles were measured for X-ray crystal diffraction and specific surface area, and observed for shape in the same manner as in Example 1.

Figure 6:
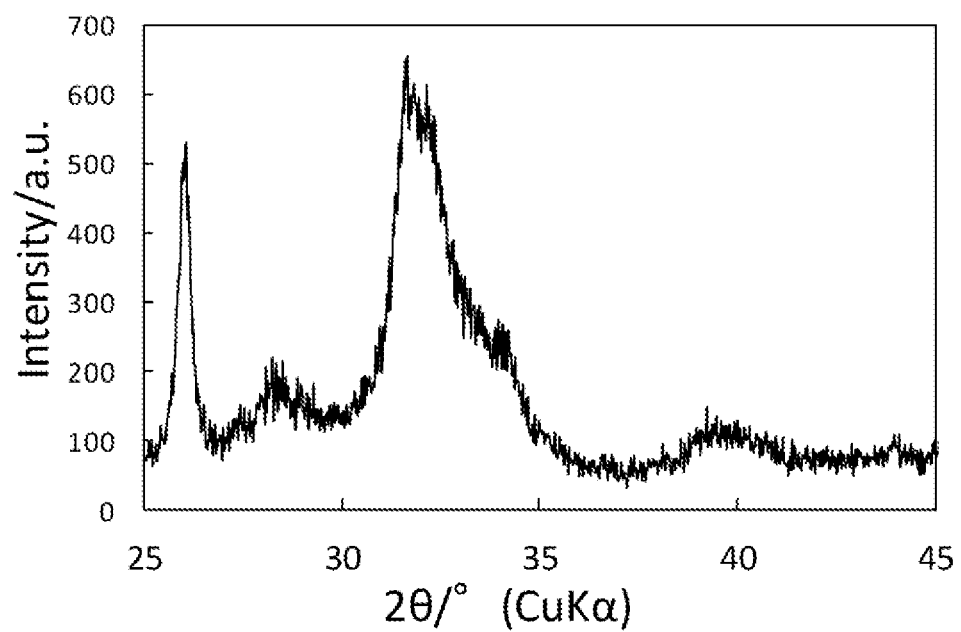
FIG. 6 illustrates the X-ray diffraction peaks of the fine hydroxyapatite particles in Example 3.

FIG. 6 illustrates the results of X-ray crystal diffraction. The ratio of the diffraction peak intensity of the (211) plane around 2θ=32° to the diffraction peak intensity of the (002) plane around 2θ=26° was 1.2, which was a value equivalent to that of Example 1. The sum of the areas of all of the diffraction peaks within the range of 25.5°≤2θ≤26.5° and the areas of all of the diffraction peaks within the range of 31.5°≤2θ≤2.5° was 36.0% based on the sum of the areas of all of the diffraction peaks within the range of 25°≤2θ≤35° taken as 100%. The crystallite size calculated from the diffraction peak of the (130) plane around 2θ=40° was 6 nm.

The specific surface area was 81.5 m²/g.

Figure 7:
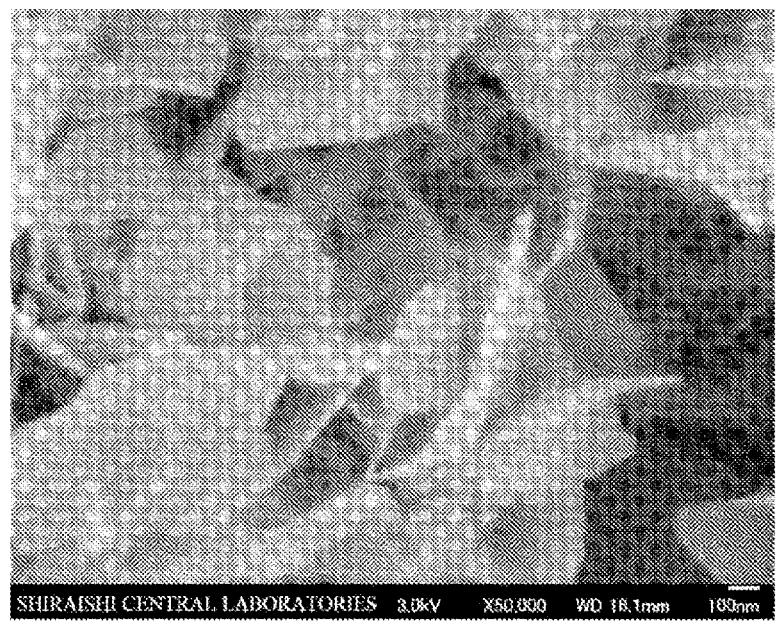
FIG. 7 illustrates an SEM photograph of the fine hydroxyapatite particles in Example 3.

FIG. 7 illustrates the results of shape observation. The results indicated that the obtained hydroxyapatite was in the form of aggregates of plate-like fine particles, as in Example 1.

Example 4

A 10.7 mass % aqueous solution of anhydrous sodium dihydrogen phosphate and a ground calcium hydroxide slurry with a solids concentration of 8.6 mass % (BET specific surface area: 7.9 m²/g, reactivity with oxalic acid: 12 minutes and 30 seconds, JP2017-036176A) were prepared so as to give a Ca/P molar ratio of 0.5. The aqueous solution of anhydrous sodium dihydrogen phosphate was placed in a stainless-steel beaker, and heated to 80° C. with stirring. The pH was left at 4.2, and not adjusted. The calcium hydroxide slurry was added thereto over a period of 30 minutes. After completion of the addition, the mixture was further stirred for 1 hour, and then filtered and washed with water, followed by drying at 80° C., thereby obtaining fine hydroxyapatite particles (powder).

The obtained fine hydroxyapatite particles were measured for X-ray crystal diffraction and specific surface area, and observed for shape in the same manner as in Example 1.

Figure 8:
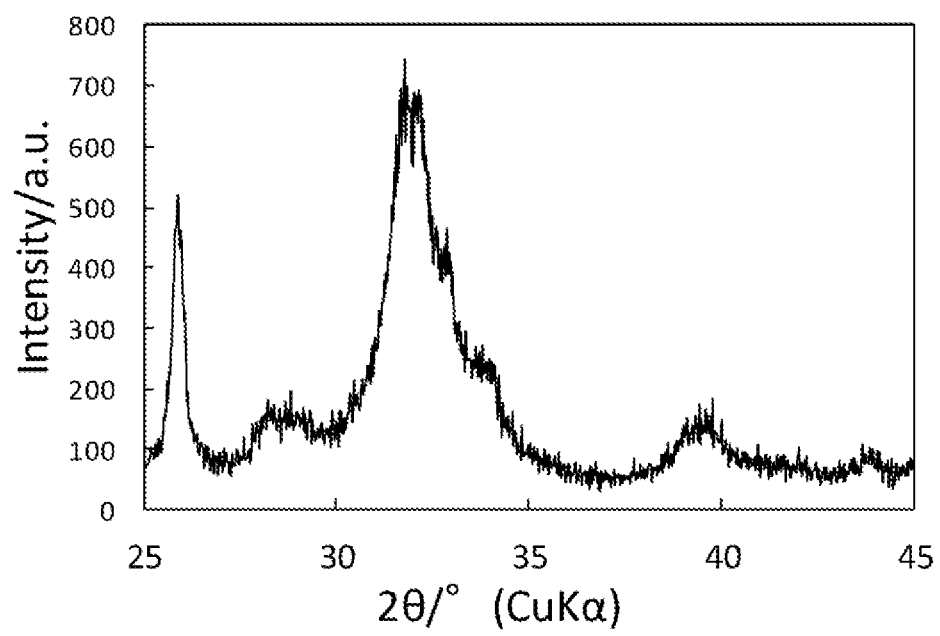
FIG. 8 illustrates the X-ray diffraction peaks of the fine hydroxyapatite particles in Example 4.

FIG. 8 illustrates the results of X-ray crystal diffraction. The ratio of the diffraction peak intensity of the (211) plane around 2θ=32° to the diffraction peak intensity of the (002) plane around 2θ=26° was 1.4, which was a value equivalent to that of Example 1. The sum of the areas of all of the diffraction peaks within the range of 25.5°≤2θ≤26.5° and the areas of all of the diffraction peaks within the range of 31.5°≤2θ≤32.5° was 37.8% based on the sum of the areas of all of the diffraction peaks within the range of 25°≤2θ≤35° taken as 100%. The crystallite size calculated from the diffraction peak of the (130) plane around 2θ=40° was 9 nm.

The specific surface area was 163.4 m²/g.

Figure 9:
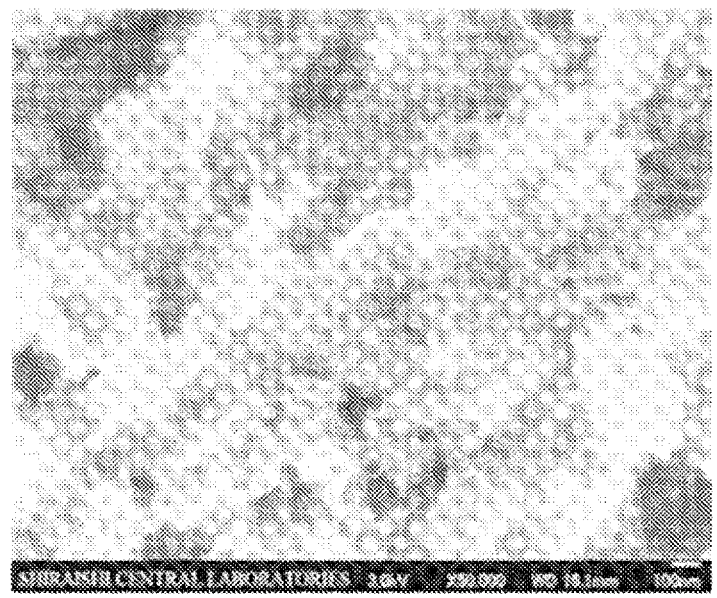
FIG. 9 illustrates an SEM photograph of the fine hydroxyapatite particles in Example 4.

FIG. 9 illustrates the results of shape observation. The results indicated that the obtained hydroxyapatite was in the form of aggregates of plate-like fine particles, as in Example 1.

Example 5

A 10.7 mass % aqueous solution of anhydrous sodium dihydrogen phosphate and a ground calcium hydroxide slurry with a solids concentration of 8.6 mass % (BET specific surface area: 7.9 m²/g, reactivity with oxalic acid: 12 minutes and 30 seconds, JP2017-036176A) were prepared so as to give a Ca/P molar ratio of 0.5. The aqueous solution of anhydrous sodium dihydrogen phosphate was placed in a stainless-steel beaker, and heated to 60° C. with stirring. The pH was left at 4.2, and not adjusted. The calcium hydroxide slurry was added thereto over a period of 30 minutes. After completion of the addition, the mixture was further stirred for 1 hour, and then filtered and washed with water, followed by drying at 80° C., thereby obtaining fine hydroxyapatite particles (powder).

The obtained fine hydroxyapatite particles were measured for X-ray crystal diffraction and specific surface area, and observed for shape in the same manner as in Example 1.

Figure 10:
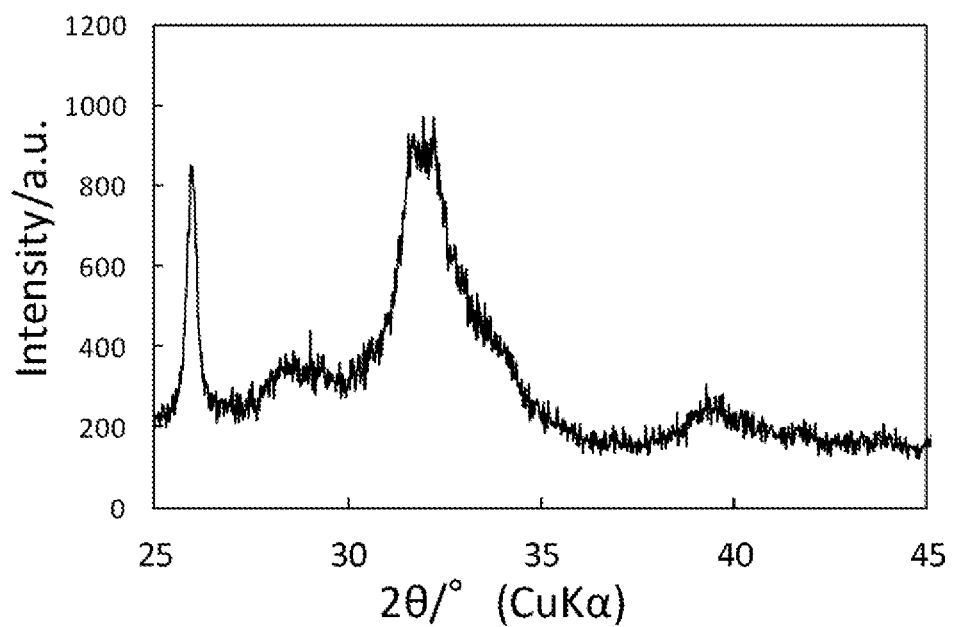
FIG. 10 illustrates the X-ray diffraction peaks of the fine hydroxyapatite particles in Example 5.

FIG. 10 illustrates the results of X-ray crystal diffraction. The ratio of the diffraction peak intensity of the (211) plane around 2θ=32° to the diffraction peak intensity of the (002) plane around 2θ=26° was 1.1, which was the same as that of Example 1. The sum of the areas of all of the diffraction peaks within the range of 25.5°≤2θ≤26.5° and the areas of all of the diffraction peaks within the range of 31.5°≤2θ≤32.5° was 31.6%, based on the sum of the areas of all of the diffraction peaks within the range of 25°≤2θ≤35° taken as 100%. The crystallite size calculated from the diffraction peak of the (130) plane around 2θ=40° was 7 nm.

The specific surface area was 94.7 m²/g.

Figure 11:
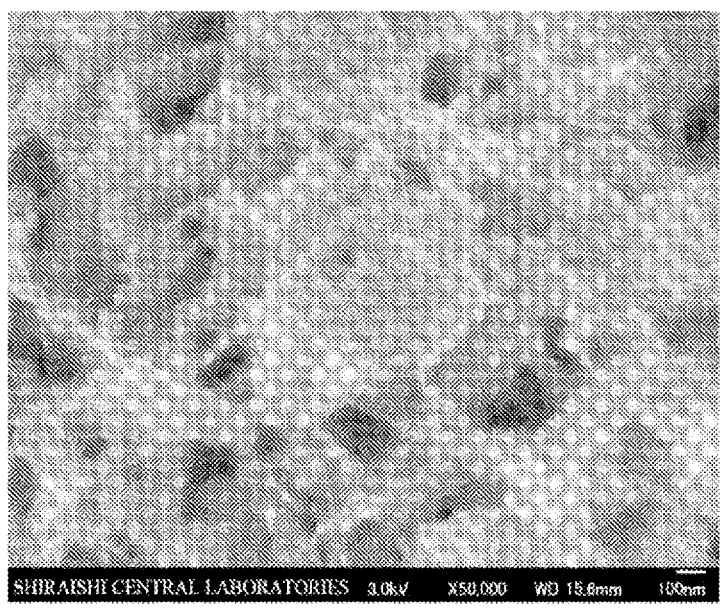
FIG. 11 illustrates an SEM photograph of the fine hydroxyapatite particles in Example 5.

FIG. 11 illustrates the results of shape observation. The results indicated that the obtained hydroxyapatite was in the form of aggregates of plate-like fine particles, as in Example 1.

Example 6

A 10.7 mass % aqueous solution of anhydrous sodium dihydrogen phosphate and a ground calcium hydroxide slurry with a solids concentration of 8.6 mass % (BET specific surface area: 7.9 m²/g, reactivity with oxalic acid: 12 minutes and 30 seconds, JP2017-036176A) were prepared so as to give a Ca/P molar ratio of 0.5. The aqueous solution of anhydrous sodium dihydrogen phosphate was placed in a stainless-steel beaker, and heated to 80° C. with stirring. The pH was left at 4.2, and not adjusted. The calcium hydroxide slurry was added thereto over a period of 30 minutes. After completion of the addition, the mixture was further stirred for 1 hour, and then filtered and washed with water, followed by drying at 80° C., thereby obtaining fine hydroxyapatite particles (powder).

The obtained fine hydroxyapatite particles were measured for X-ray crystal diffraction and specific surface area, and observed for shape in the same manner as in Example 1.

Figure 12:
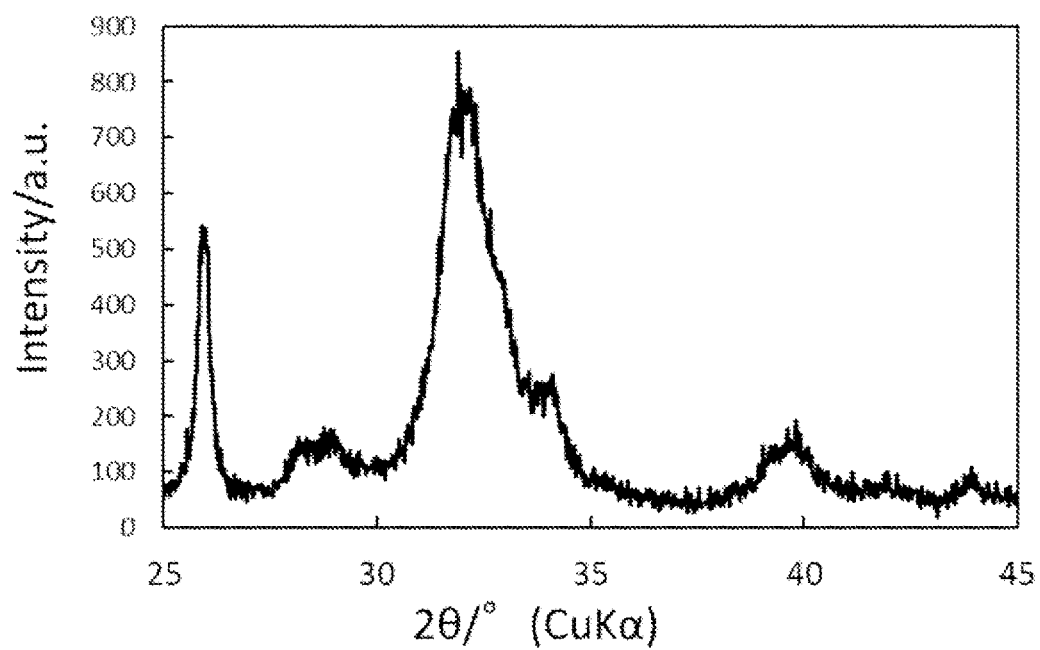
FIG. 12 illustrates the X-ray diffraction peaks of the fine hydroxyapatite particles in Example 6.

FIG. 12 illustrates the results of X-ray crystal diffraction. The ratio of the diffraction peak intensity of the (211) plane around 2θ=32° to the diffraction peak intensity of the (002) plane around 2θ=26° was 1.58. The sum of the areas of all of the diffraction peaks within the range of 25.5°≤2θ≤26.5° and the areas of all of the diffraction peaks within the range of 31.5°≤2θ≤32.5° was 40.9%, based on the sum of the areas of all of the diffraction peaks within the range of 25°≤2θ≤35° taken as 100%. The crystallite size calculated from the diffraction peak of the (130) plane around 2θ=40° was 7 nm.

The specific surface area was 105.0 m²/g.

Figure 13:
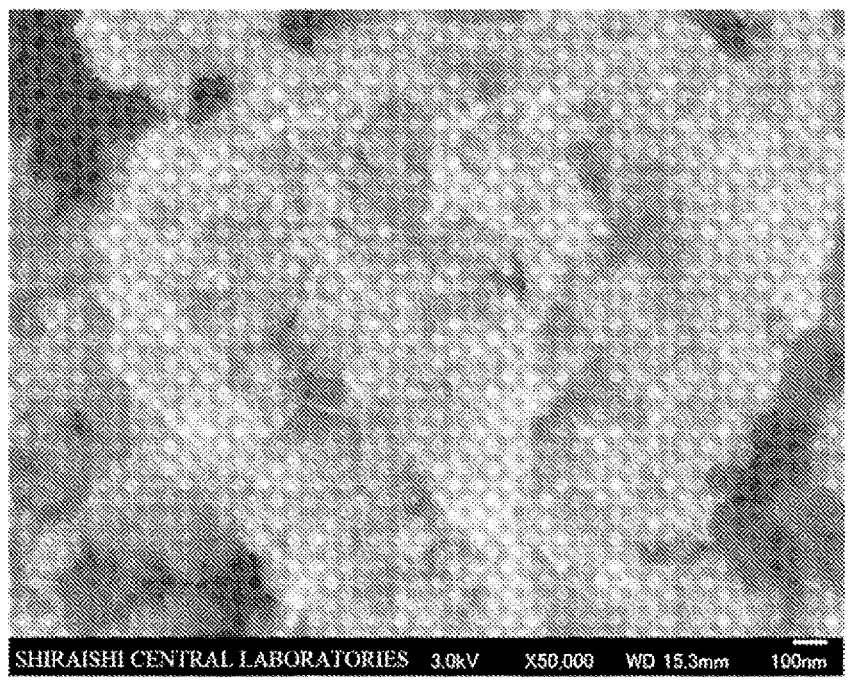
FIG. 13 illustrates an SEM photograph of the fine hydroxyapatite particles in Example 6.

FIG. 13 illustrates the results of shape observation. The results indicated that the obtained hydroxyapatite was in the form of aggregates of plate-like fine particles, as in Example 1.

Example 7

A 10.7 mass % aqueous solution of sodium dihydrogen phosphate-2 hydrate and a ground calcium hydroxide slurry with a solids concentration of 8.6 mass % (BET specific surface area: 6.7 m²/g, reactivity with oxalic acid: 15 minutes and 30 seconds, JP2017-036176A) were prepared so as to give a Ca/P molar ratio of 0.5. The aqueous solution of sodium dihydrogen phosphate-2 hydrate was placed in a stainless-steel beaker, and heated to 60° C. with stirring. This temperature was maintained until the end of stirring. A 10% aqueous solution of NaOH was added to adjust the pH to 5.5. The calcium hydroxide slurry was added thereto over a period of 30 minutes. After completion of the addition, the mixture was further stirred for 1 hour, and then filtered and washed with water, followed by drying at 80° C. After that, the mixture was allowed to stand at 40° C. and at 75% RH for 6 months, thereby obtaining fine hydroxyapatite particles (powder).

The obtained fine hydroxyapatite particles were measured for X-ray crystal diffraction and specific surface area, and observed for shape in the same manner as in Example 1.

Figure 14:
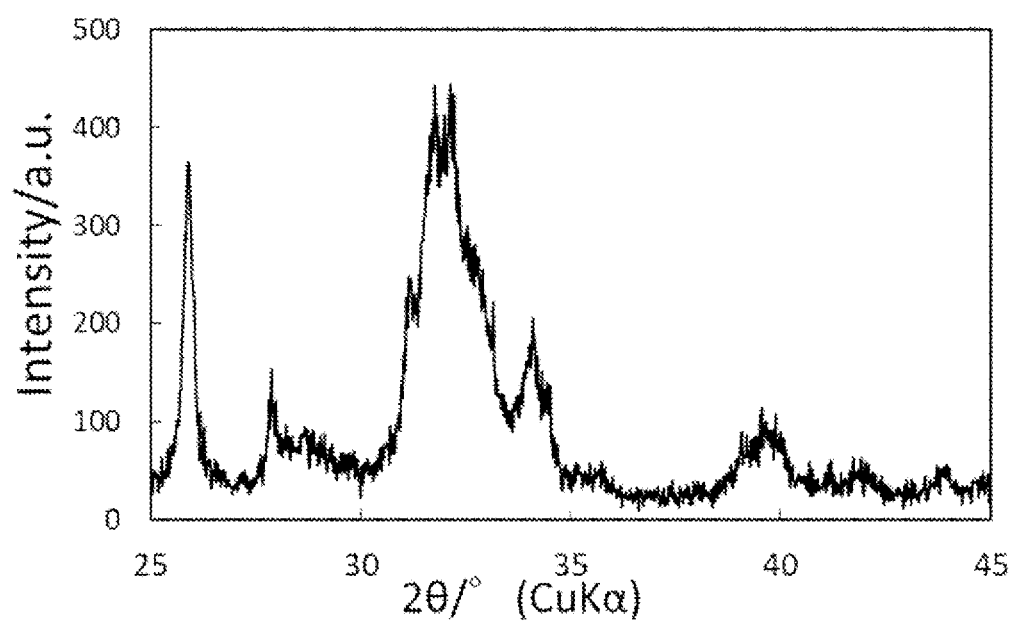
FIG. 14 illustrates the X-ray diffraction peaks of the fine hydroxyapatite particles in Example 7.

FIG. 14 illustrates the results of X-ray crystal diffraction. The ratio of the diffraction peak intensity of the (211) plane around 2θ=32° to the diffraction peak intensity of the (002) plane around 2θ=26° was 1.21. The sum of the areas of all of the diffraction peaks within the range of 25.5°≤2θ≤26.5° and the areas of all of the diffraction peaks within the range of 31.5°≤2θ≤32.5° was 39.4%, based on the sum of the areas of all of the diffraction peaks within the range of 25°≤2θ≤35° taken as 100%. The crystallite size calculated from the diffraction peak of the (130) plane around 2θ=40° was 8 nm.

The specific surface area was 34.8 m²/g.

Example 8

A 10.7 mass % aqueous solution of sodium dihydrogen phosphate-2 hydrate and a ground calcium hydroxide slurry with a solids concentration of 8.6 mass % (BET specific surface area: 7.9 m²/g, reactivity with oxalic acid: 12 minutes and 30 seconds, JP2017-036176A) were prepared so as to give a Ca/P molar ratio of 0.5. The aqueous solution of sodium dihydrogen phosphate-2 hydrate was placed in a stainless-steel beaker, and a 10% aqueous solution of NaOH was added to adjust the pH to 5.5. The calcium hydroxide slurry was added thereto over a period of 50 minutes. After completion of the addition, the mixture was further stirred for 1 hour. After stirring was ended, the mixture was allowed to stand at room temperature for 9 days, and then filtered and washed with water, followed by drying at 80° C., thereby obtaining fine hydroxyapatite particles (powder).

The obtained fine hydroxyapatite particles were measured for X-ray crystal diffraction and observed for shape in the same manner as in Example 1.

Figure 15:
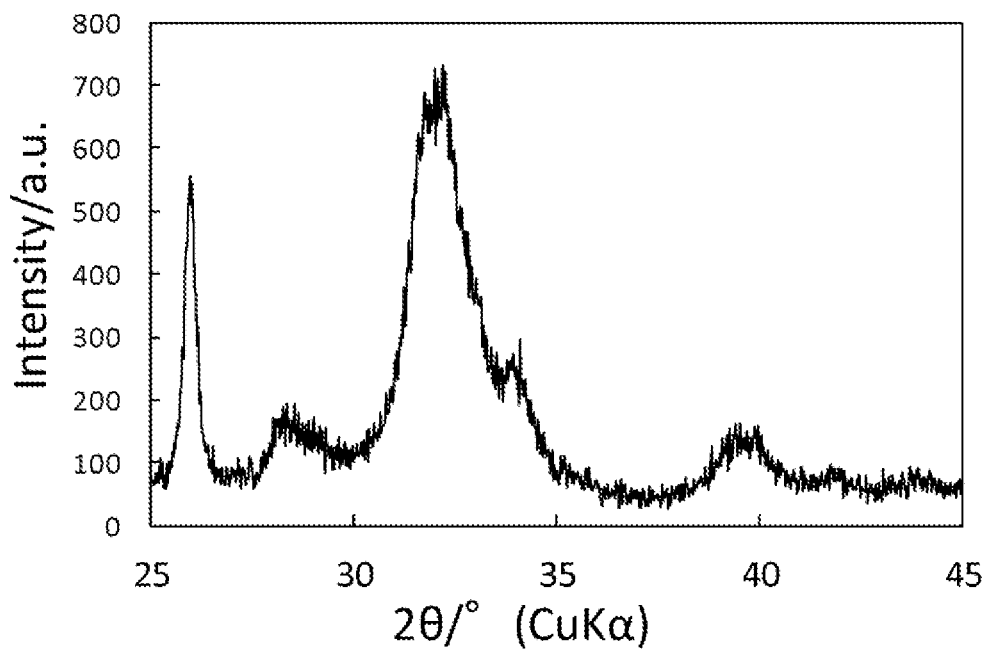
FIG. 15 illustrates the X-ray diffraction peaks of the fine hydroxyapatite particles in Example 8.

FIG. 15 illustrates the results of X-ray crystal diffraction. The ratio of the diffraction peak intensity of the (211) plane around 2θ=32° to the diffraction peak intensity of the (002) plane around 2θ=26° was 1.3.

Figure 16:
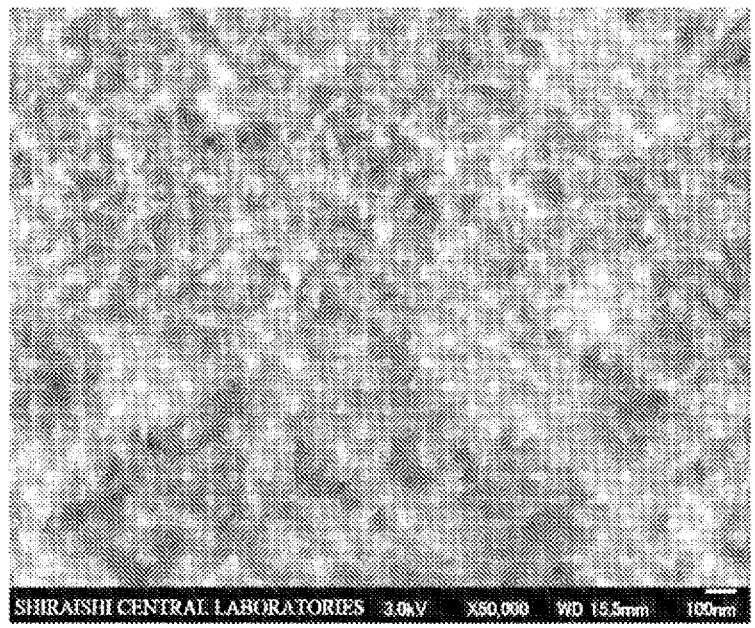
FIG. 16 illustrates an SEM photograph of the fine hydroxyapatite particles in Example 8.

FIG. 16 illustrates the results of shape observation. The results indicated that the shape of the particles was an aggregate of spindle-like fine particles.

Comparative Example 1

A 10.7 mass % aqueous solution of anhydrous sodium dihydrogen phosphate and a ground calcium hydroxide slurry with a solids concentration of 8.6 mass % (BET specific surface area: 7.9 m²/g, reactivity with oxalic acid: 12 minutes and 30 seconds, JP2017-036176A) were prepared so as to give a Ca/P molar ratio of 0.5. The calcium hydroxide slurry was placed in a stainless-steel beaker, and heated to 40° C. with stirring. The aqueous solution of anhydrous sodium dihydrogen phosphate (pH: 4.2) was added thereto over a period of 30 minutes. After completion of the addition, the mixture was further stirred for 1 hour, and then filtered and washed with water, followed by drying at 80° C., thereby obtaining fine hydroxyapatite particles (powder).

The obtained fine hydroxyapatite particles were measured for X-ray crystal diffraction and specific surface area, and observed for shape in the same manner as in Example 1.

Figure 17:
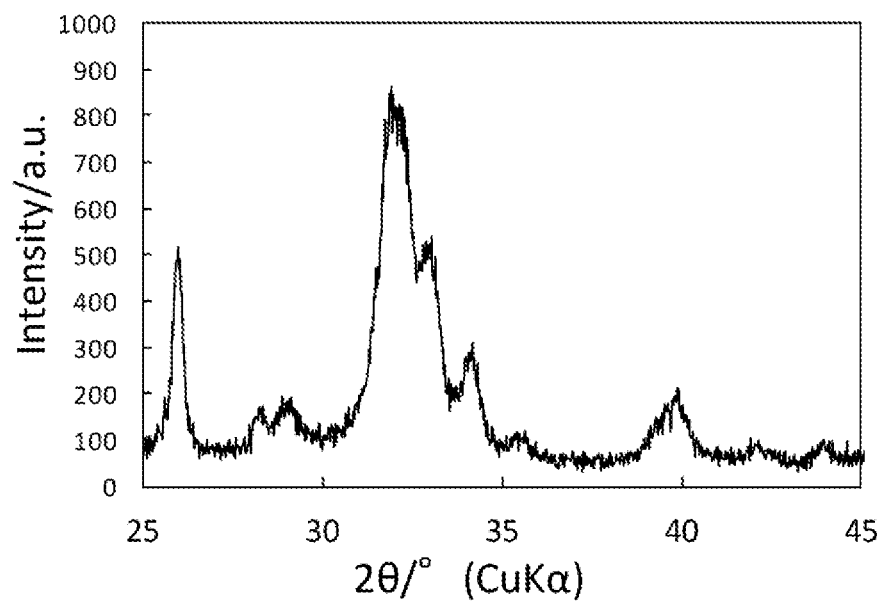
FIG. 17 illustrates the X-ray diffraction peaks of the fine hydroxyapatite particles in Comparative Example 1.

FIG. 17 illustrates the results of X-ray crystal diffraction. The ratio of the diffraction peak intensity of the (211) plane around 2θ=32° to the diffraction peak intensity of the (002) plane around 2θ=26° was 1.7, which was clearly higher than the value of Example 1. The diffraction peaks of the (300) plane around 2θ=33° appeared separately.

The specific surface area was 50.9 m²/g.

Figure 18:
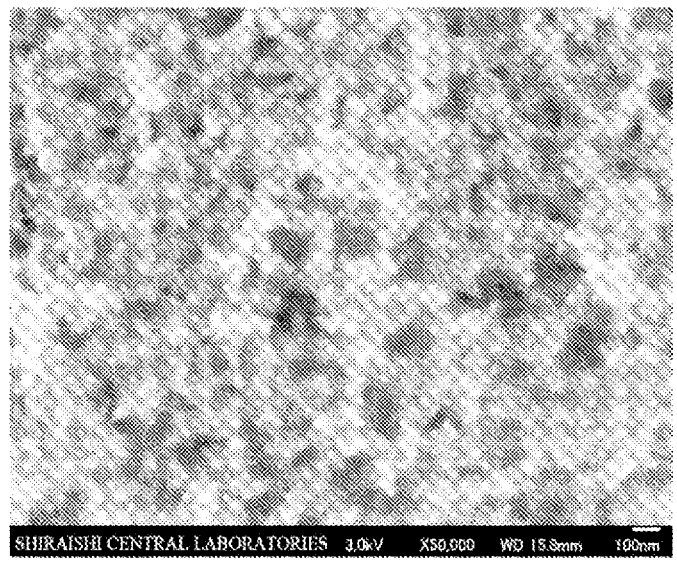
FIG. 18 illustrates an SEM photograph of the fine hydroxyapatite particles in Comparative Example 1.

FIG. 18 illustrates the results of shape observation. The results indicated that the shape of the particles was an aggregate of spindle-like fine particles.

Comparative Example 2

A 10.7 mass % aqueous solution of sodium dihydrogen phosphate-2 hydrate and a ground calcium hydroxide slurry with a solids concentration of 8.6 mass % (JP2017-036176A) were prepared so as to give a Ca/P molar ratio of 0.5. The aqueous solution of sodium dihydrogen phosphate-2 hydrate was placed in a stainless-steel beaker, and heated to 60° C. with stirring. This temperature was maintained until the end of stirring. The pH was left at 4.2, and not adjusted. The calcium hydroxide slurry was added thereto over a period of 45 minutes. After completion of the addition, the mixture was further stirred for 1 hour, and then filtered and washed with water, followed by drying at 80° C., thereby obtaining a sample.

The obtained sample was measured for X-ray crystal diffraction and observed for shape in the same manner as in Example 1.

Figure 19:
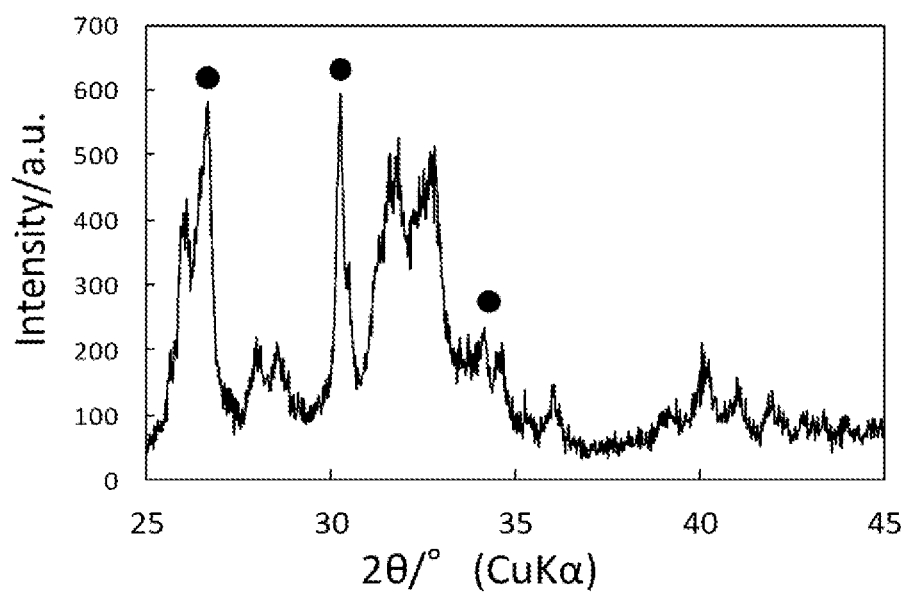
FIG. 19 illustrates the X-ray diffraction peaks of the sample in Comparative Example 2. The peaks indicated by a solid black circle are diffraction peaks of monetite.

FIG. 19 illustrates the results of X-ray crystal diffraction. Diffraction peaks of other substances in addition to the diffraction peaks of hydroxyapatite were confirmed. The peaks indicated by solid black circles in FIG. 19 are diffraction peaks of monetite, which is calcium phosphate that tends to form under acidic conditions.

Figure 20:
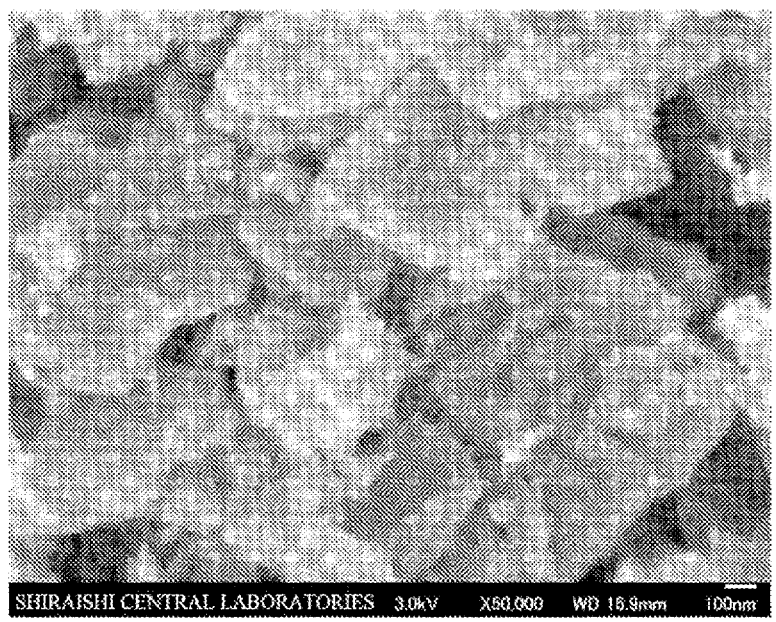
FIG. 20 illustrates an SEM photograph of the sample in Comparative Example 2.

FIG. 20 illustrates the results of shape observation. Large plate-like particles of monetite were confirmed.

Comparative Example 3

A 10.7 mass % aqueous solution of sodium dihydrogen phosphate-2 hydrate and a high-purity calcium hydroxide slurry with a solids concentration of 8.6 mass % (BET specific surface area: 2.4 m$^2$/g, reactivity with oxalic acid: 25 seconds, JP2011-126772A) were prepared so as to give a Ca/P molar ratio of 0.5. The aqueous solution of sodium dihydrogen phosphate-2 hydrate was placed in a stainless-steel beaker, and heated to 60° C. with stirring. This temperature was maintained until the end of stirring. A 10% aqueous solution of NaOH was added to adjust the pH to 5.5. The calcium hydroxide slurry was added thereto over a period of 30 minutes. After completion of the addition, the mixture was further stirred for 1 hour, and then filtered and washed with water, followed by drying at 80° C., thereby obtaining a sample.

The obtained sample was measured for X-ray crystal diffraction in the same manner as in Example 1.

Figure 21:
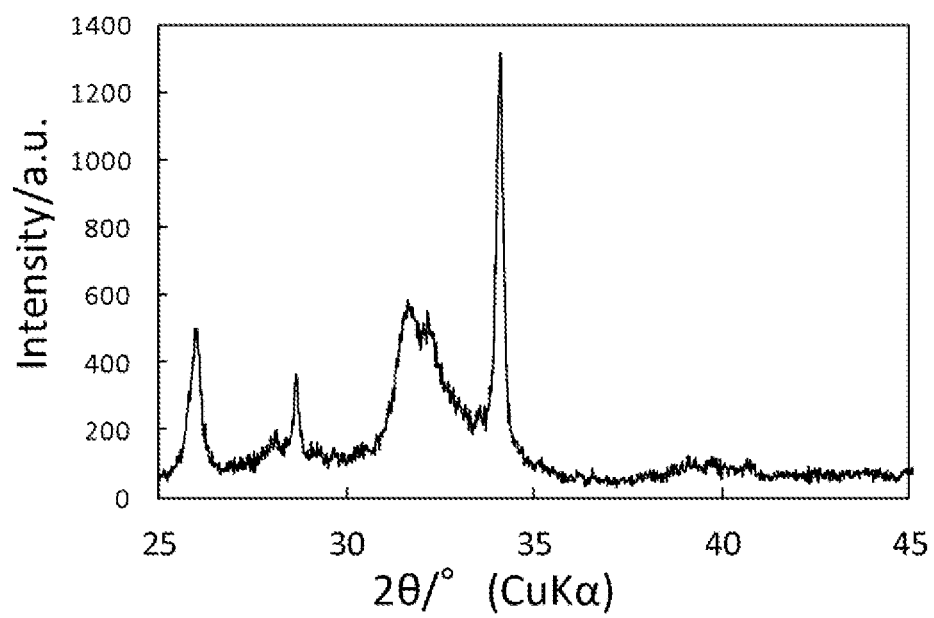
FIG. 21 illustrates the X-ray diffraction peaks of the sample in Comparative Example 3.

FIG. 21 illustrates the results of X-ray crystal diffraction. In addition to the diffraction peaks of hydroxyapatite, the diffraction peaks of calcium hydroxide were confirmed around 2θ=28° and around 2θ=34°.

Figure 22:
FIG. 22 illustrates an SEM photograph of the sample in Comparative Example 3.

FIG. 22 illustrates the results of shape observation. Large plate-like particles of calcium hydroxide were confirmed. The difference from Example 1 was speculated to be due to the physical properties of the calcium hydroxide used as a starting material.

Comparative Example 4

A 10.7 mass % aqueous solution of sodium dihydrogen phosphate-2 hydrate and a ground calcium hydroxide slurry with a solids concentration of 8.6 mass % (JP2017-036176A) were prepared so as to give a Ca/P molar ratio of 0.5. The aqueous solution of sodium dihydrogen phosphate-2 hydrate was placed in a stainless-steel beaker, and heated to 80° C. with stirring. This temperature was maintained until the end of stirring. The pH was left at 4.2, and not adjusted. The calcium hydroxide slurry was then added thereto over a period of 50 minutes. After completion of the addition, the mixture was further stirred for 1 hour, and then filtered and washed with water, followed by drying at 80° C., thereby obtaining a sample.

The obtained sample was measured for X-ray crystal diffraction and observed for shape in the same manner as in Example 1.

Figure 23:
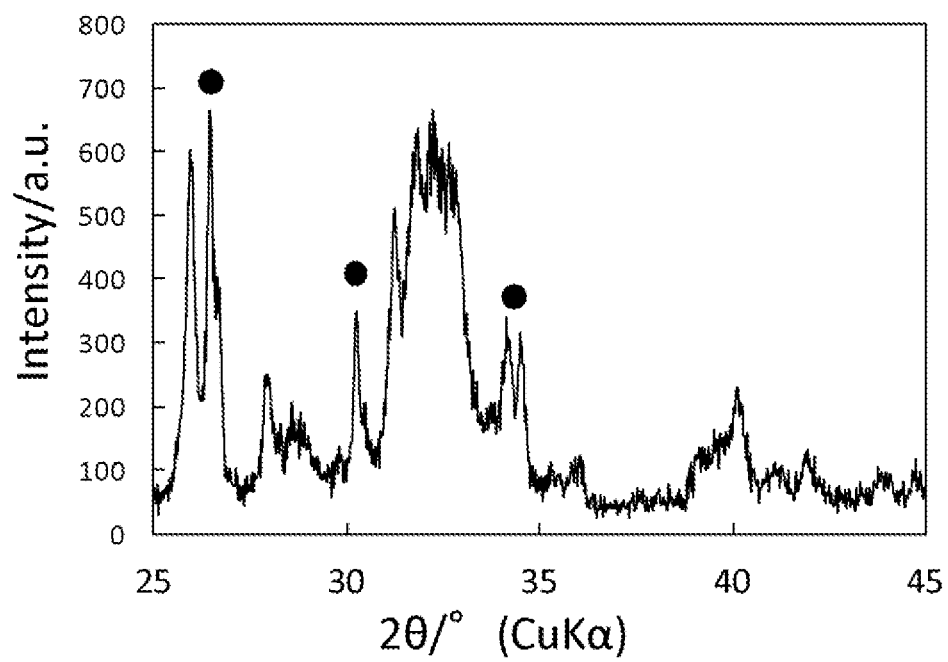
FIG. 23 illustrates the X-ray diffraction peaks of the sample in Comparative Example 4. The peaks indicated by a solid black circle are diffraction peaks of monetite.

FIG. 23 illustrates the results of X-ray crystal diffraction. In addition to the diffraction peaks of hydroxyapatite, diffraction peaks of other substances were also confirmed. The peaks indicated by solid black circles are diffraction peaks of monetite, which is calcium phosphate that tends to form under acidic conditions.

Figure 24:
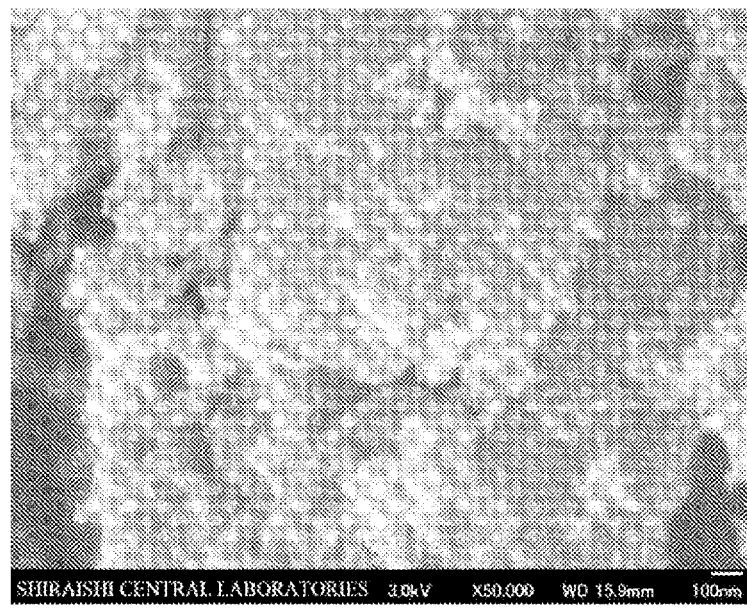
FIG. 24 illustrates an SEM photograph of the sample in Comparative Example 4.

FIG. 24 illustrates the results of shape observation. Large plate-like particles of monetite were confirmed.

Test Example 1: Crystallinity Change Confirmation Test

Test Purpose

To evaluate the reactivity of fine hydroxyapatite particles within the oral cavity, changes in crystallinity before and after immersion in artificial saliva were measured with a powder X-ray diffractometer.

Test Method 0.5 g of fine hydroxyapatite particles obtained in the same manner as in Example 1 were immersed in 200 mL of artificial saliva ($CaCl_2$: 1.5 mM, $KH_2PO_4$: 0.9 mM, KCl: 130 mM, HEPES: 20 mM, pH 7.0 (KOH)) for 7 days. Powder separated by suction filtration was measured with a powder X-ray diffractometer, and changes in crystallinity before and after immersion in artificial saliva were observed.

Measurement Conditions

Model used: MiniFlex II (Rigaku Corporation)
Start angle: 2θ°
End angle: 40°
Sampling range: 0.02°
Scanning rate: 4.0°/min
Voltage: 30 kV
Current: 15 mA
Divergence slit: 1.25°
Scatter slit: 8.0 mm
Light-receiving slit: 0.3 mm.

Figure 25:
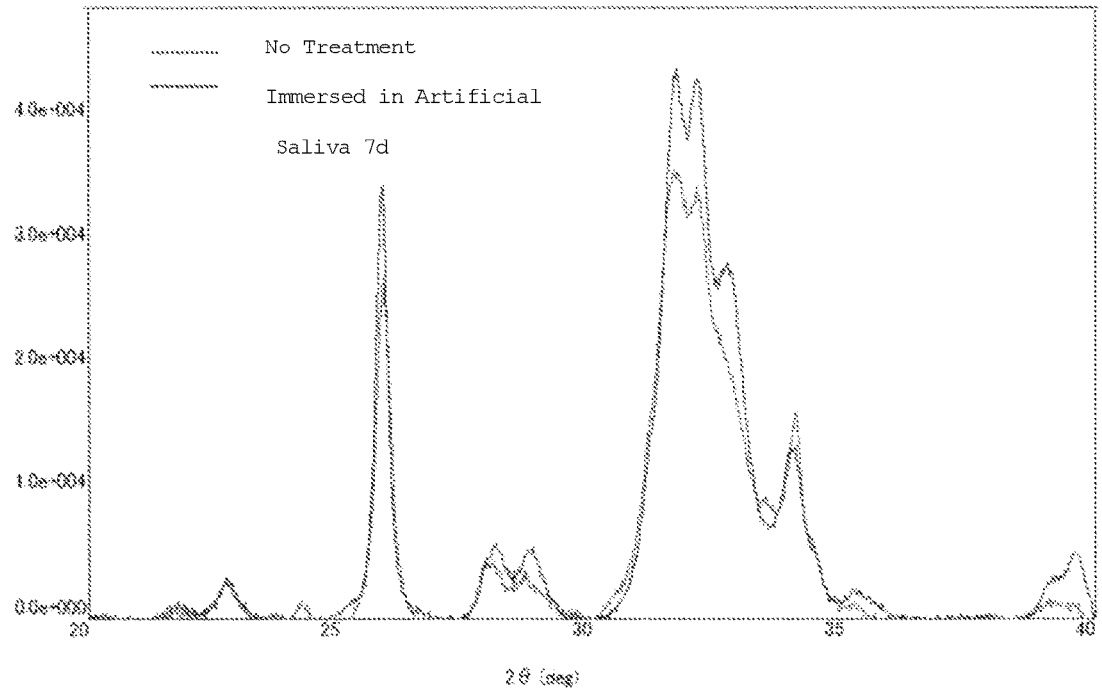
FIG. 25 illustrates the X-ray diffraction peaks of fine hydroxyapatite particles before and after being immersed in artificial saliva (Test Example 1).

FIG. 25 illustrates the results. The immersion in artificial saliva was confirmed to have improved crystallinity (=increased peak sharpness and appearance of broad, hidden peaks). This indicates that the fine hydroxyapatite particles according to the present invention change within the oral cavity (i.e., they are reactive).

Test Example 2: Test on Properties to Seal Dentinal Tubules of Fine Hydroxyapatite Particles Test Purpose To evaluate the ability of fine hydroxyapatite particles to seal dentinal tubules, the surface of bovine dentin was brushed with a solution of fine hydroxyapatite particles, and the degree of sealing of dentinal tubules was examined by observation with an electron microscope (SEM).

Test Method

Preparation of Dentin Block (Sample)
1. The dentin on the root surface of an extracted bovine tooth was cut out to a size of 5×5 mm.
2. The cut tooth fragment was embedded in resin (polymethyl methacrylate), and a block was prepared, followed by polishing the block with waterproof abrasive paper to expose the surface.
3. The dentin block was immersed in a 5% w/w aqueous EDTA solution (pH 7.0) for 2 minutes.
4. Sonication was performed in distilled water for 5 minutes.

Preparation of Liquid of Fine Hydroxyapatite Particles
5. 0.3 g of fine hydroxyapatite particles obtained in the same manner as in Example 1 were suspended in 39.7 g of a viscous diluent.

Brushing Treatment

6. The dentin block was brushed in the suspension of fine hydroxyapatite particles (40 g) for 30 seconds with a toothbrush (GUM #211) (stroke: 150 rpm, load: 160 g).
7. After the dentin block was washed with water, the block was immersed in artificial saliva ($CaCl_2$: 1.5 mM, $KH_2PO_4$: 0.9 mM, KCl: 130 mM, HEPES: 20 mM, pH 7.0 (KOH)) for 5 minutes.
8. The above operations 1 and 2 were performed 6 times.

Observation with SEM

9. The surface was vapor-deposited, and observed with an electron microscope.

Conditions of Observation and Measurement

Deposition Treatment
    Model used: MCI1000 (Hitachi High-Tech Corporation)
    Current: 20 mA
    Treatment time: 120 seconds Observation with SEM
    Model used: S-3400N (Hitachi High-Tech Corporation)
    Detector: SE (secondary electron image)
    Applied voltage: 5 kV
    Probe current: 50 mA
    Magnification: 25000×

Figure 26:
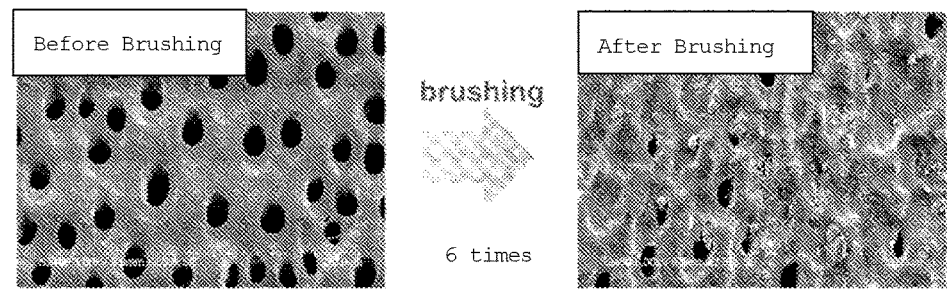
FIG. 26 illustrates SEM photographs of dentinal tubules before and after being brushed (Test Example 2).

FIG. 26 illustrates the results. Dentinal tubules were confirmed to have been sealed by brushing in the solution of fine hydroxyapatite particles. This indicates that the fine hydroxyapatite particles seal the dentinal tubules present in the surface of dentin.

Test Example 3: Adhesion Test

Test Purpose

To evaluate the ability of fine hydroxyapatite particles to adhere within dentinal tubules, the surface of bovine dentin was brushed with a solution of fine hydroxyapatite particles, and then water pressure was applied from the back of dentin. Whether the sealing of fine hydroxyapatite particles withstood the water pressure was examined by observation with an electron microscope (SEM).

Test Method

Preparation of Dentin Disc (Sample)
  1. The dentin on the root surface of an extracted bovine tooth was cut out to a size of 5×5 mm.
  2. The cut tooth fragment was polished with waterproof abrasive paper.
  3. The dentin disc was immersed in a 5% w/w aqueous EDTA solution (pH 7.0) for 2 minutes.
  4. Sonication was performed in distilled water for 5 minutes.

Preparation of Liquid of Fine Hydroxyapatite Particles
  5. 1 g of fine hydroxyapatite particles obtained in the same manner as in Example 1 were suspended in 39 g of a viscous diluent.

Brushing Treatment
  6. A dentin disc was brushed in the suspension of fine hydroxyapatite particles (40 g) for 30 seconds with a toothbrush (GUM #211) (stroke: 150 rpm, load: 160 g).
  7. The disc was washed with water, and immersed in artificial saliva ($CaCl_2$: 1.5 mM, $KH_2PO_4$: 0.9 mM, KCl: 130 mM, HEPES: 20 mM, pH 7.0 (KOH)) for 5 minutes.
  8. The above operations 1 and 2 were performed 6 times.
  9. The disc was immersed in artificial saliva for 7 days.

Water-Pressure Treatment
  10. Pressure was applied at 0.1 MPa for 30 minutes to a dentin disc that was brushed beforehand, by using an instrument with reference to a report of Pashley et al. (Pashley D H, Galloway S E. The effects of oxalate treatment on the smear layer of ground surfaces of human dentin. Arch. Oral Biol. 1983; 30: 731-737).

Observation with SEM
  11. The surface was vapor-deposited, and observed with an electron microscope.

Conditions of Observation and Measurement Deposition Treatment
    Model used: MCI1000 (Hitachi High-Tech Corporation)
    Current: 20 mA
    Treatment time: 120 seconds Observation with SEM
    Model used: S-3400N (Hitachi High-Tech Corporation)
    Detector: SE (secondary electron image)
    Applied voltage: 5 kV
    Probe current: 50 mA
    Magnification: 25000×

Figure 27:
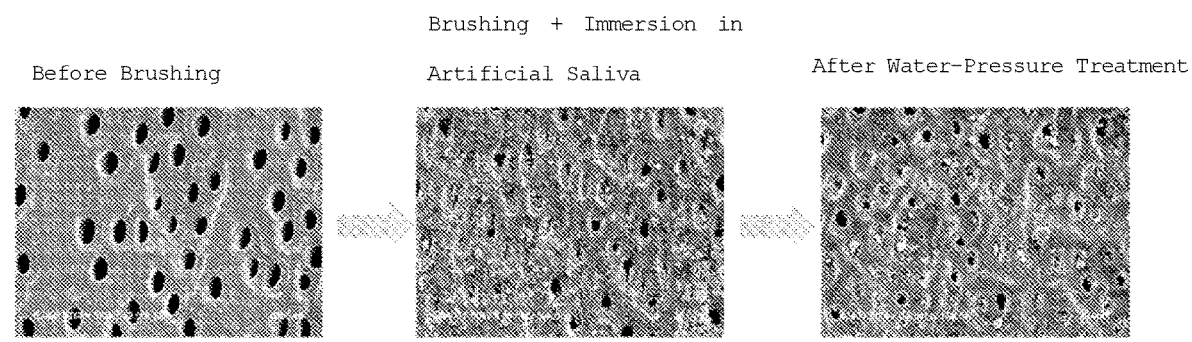
FIG. 27 illustrates SEM photographs of dentinal tubules before and after water-pressure treatment (Test Example 3).

FIG. 27 illustrates the results. The dentinal tubules were confirmed to have been sealed after water-pressure treatment. This indicates that the fine hydroxyapatite particles adhere within dentinal tubules, and maintain the sealed condition.

The invention claimed is:

1. A fine hydroxyapatite particle having a ratio of a diffraction peak intensity around $2\theta=32°$ to a diffraction peak intensity around $2\theta=26°$ of 0.8 to 1.3 in an X-ray diffraction pattern as measured by using CuKα radiation, the fine hydroxyapatite particle being an aggregate of particles, the fine hydroxyapatite particle having a Ca/P molar ratio of 1.4 or less, and a crystallite size calculated from a diffraction peak of a (130) plane around $2\theta=40°$ is 12 nm or less.

2. The fine hydroxyapatite particle according to claim 1, having a median diameter of 5 μm or less.

3. The fine hydroxyapatite particle according to claim 1, having a specific surface area of 30 to 200 $m^2/g$.

4. The fine hydroxyapatite particle according to claim 1, further having a ratio of a diffraction peak intensity around $2\theta=34°$ to a diffraction peak intensity around $2\theta=32°$ of 1 or less in an X-ray diffraction pattern as measured by using CuKα radiation.

5. An additive for an oral composition, the additive comprising the fine hydroxyapatite particle of claim 1.

6. A dentinal tubule sealant comprising the fine hydroxyapatite particle of claim 1.

7. A method for producing the fine hydroxyapatite particle of claim 1, comprising mixing an aqueous alkaline phosphate solution with a pH of 4 to 7 with a calcium hydroxide slurry to react the mixture at 35 to 85° C.

8. The method according to claim 7, wherein the calcium hydroxide slurry is a ground calcium hydroxide slurry.

9. The method according to claim 7, wherein the calcium hydroxide slurry has a reactivity with oxalic acid of 40 minutes or less, the reactivity with oxalic acid being a period of time (minutes) until a pH of 7.0 is achieved after 40 g of an aqueous oxalic acid solution that is maintained at 25±1° C. and that has a concentration of 0.5 mol/L is added at one time to 50 g of the calcium hydroxide slurry that is adjusted to a concentration of 5 mass % and that is maintained at 25±1° C.

10. The method according to claim 7, wherein the calcium hydroxide slurry has a BET specific surface area of 5 $m^2/g$ or more.

* * * * *